United States Patent

Sansone

[11] 4,076,481
[45] Feb. 28, 1978

[54] ANNULAR EXTRUSION DIE

[75] Inventor: Leonard F. Sansone, Andover, N.J.

[73] Assignee: Sussex Plastics Engineering, Inc., Andover, N.J.

[21] Appl. No.: 664,905

[22] Filed: Mar. 8, 1976

Related U.S. Application Data

[63] Continuation-in-part of Ser. No. 541,198, Jan. 15, 1975, abandoned.

[51] Int. Cl.² ............................................. B29D 23/04
[52] U.S. Cl. .................................. 425/376 B; 425/380; 425/467

[58] Field of Search ........................ 259/191; 264/209; 425/380, 381, 467, 466, 376, 381.2, 461; 72/264, 269

[56] References Cited

U.S. PATENT DOCUMENTS

| 2,937,402 | 5/1960 | Pierce | 425/378 X |
| 3,008,187 | 11/1961 | Slade | 264/209 X |

Primary Examiner—Francis S. Husar
Assistant Examiner—Mark Rosenbaum
Attorney, Agent, or Firm—Jacobs & Jacobs

[57] ABSTRACT

An annular extrusion die having a rotating shear ring which provides a pumping and shearing action on the plastic as it passes through the die annulus, and a method of forming annular extrusions.

15 Claims, 9 Drawing Figures

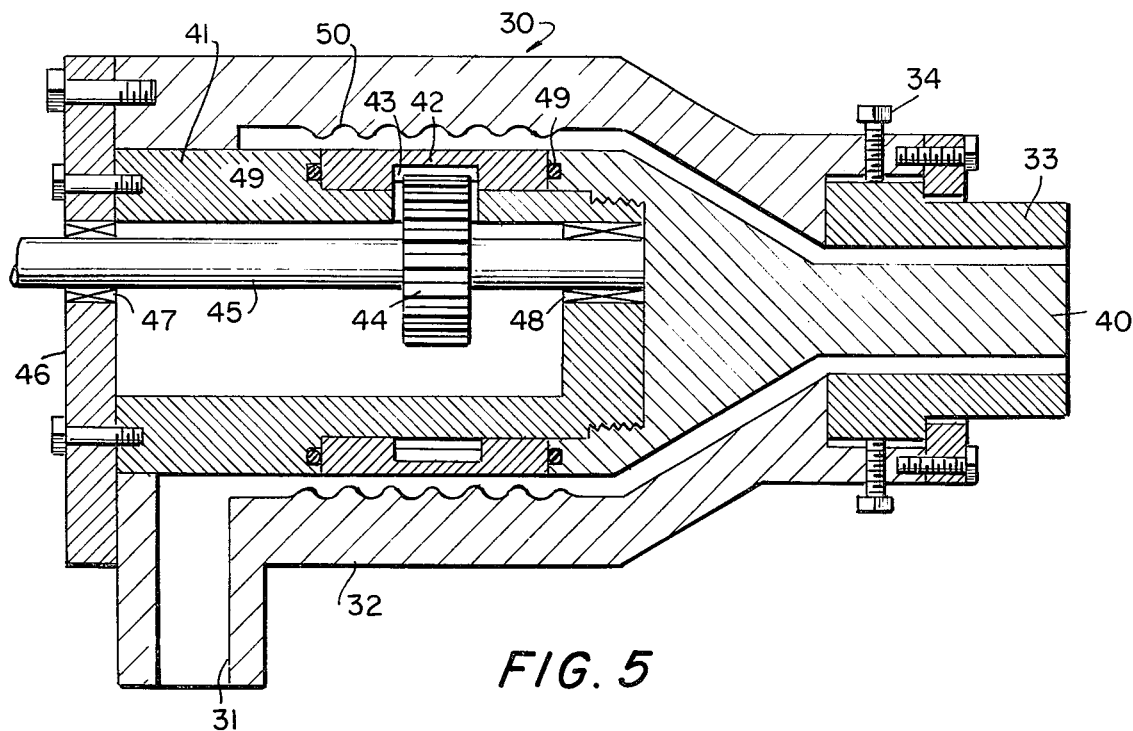
FIG. 5
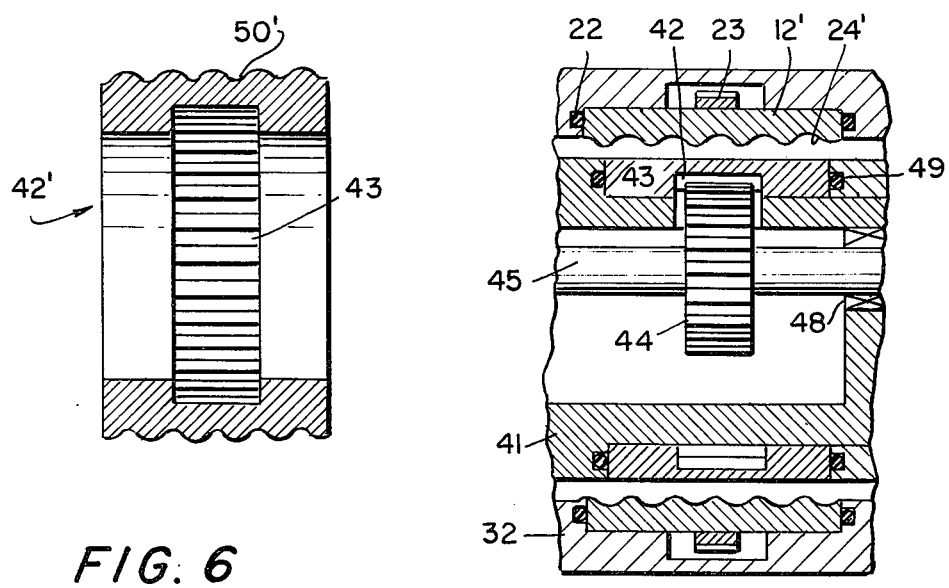
FIG. 6
FIG. 7

ANNULAR EXTRUSION DIE

CROSS-REFERENCE TO RELATED APPLICATION

This is a continuation-in-part of my copending application Ser. No. 541,198, filed Jan. 15, 1975, entitled ANNULAR EXTRUSION DIE, now abandoned, which is hereby incorporated herein by reference thereto.

BACKGROUND OF THE INVENTION

Degradable materials, such as poly(vinyl chloride), presently are extruded through annular dies to form tubes, film or parisons for subsequent blow molding. Both single and multiple screw extruders are employed. In the single screw extruder, the material is melted on the screw, intensively mixed and pumped through the die orifice at a temperature of 410°-430° F. In the multiple screw extruder, fusion is delayed until the material enters the last few flights of the screws. The multiple screw extruder utilizes deep-flighted screws and lower shear rates resulting in less mechanical energy input to the plastic, whereby the stock temperature after passing through the die is, typically, 380° F. Due to the lower temperatures of the material on the screw and the lower final stock temperature, it is possible to employ less stabilizer in multiple screw poly(vinyl chloride) formulations with appreciable cost savings.

The annulus for plastic extrusion is generally formed between an inner mandrel supported in concentric relation to an outer die member by a plurality of streamlined spider legs. The plastic stream must flow around these spider legs and then weld downstream in the annular area. These spider legs present an area for stagnation and subsequent degradation of degradable materials such as poly(vinyl chloride). The problem is most severe on single screw extruders, because of the high stock temperatures employed, and is less pronounced on multiple screw extruders. However, on both types of equipment, the length of run often is limited by material degradation on the spider legs.

It is known that high molecular weight poly(vinyl chloride) provides superior impact strength, higher elastic modulus and higher tensile strength. However, such material has a higher melt viscosity which results in poor processability on either single or multiple screw extruders. This is due to non-uniform shearing patterns found in both single and multiple screw extruders, resulting in differences in degree of mixing and final stock temperatures within the melt.

An extrusion die made in accordance with this invention is particularly adapted for processing high molecular weight resins to produce smooth, uniform extrudates having fully developed physical properties.

SUMMARY OF THE INVENTION

An extrusion die has an annulus formed between an outer die member and an inner mandrel member, which mandrel member is supported by a plurality of streamlined spider legs or other suitable support member. A rotating shear ring is provided on the die member and/or the mandrel member upstream of the extrusion die outlet, and one or both of the opposed surfaces of the shear rings or members facing the annulus is provided with at least one helical groove. Further, the outer die member and the inner mandrel member are stationary at the extrusion die outlet. In operation, the rotating shear ring in combination with the helical groove or grooves subjects the material to a pumping and shearing action as the material passes through the die annulus, thereby providing a uniform mixing action and melt, which results in a smooth extrudate, and a pumping action, which reduces the pressures on the extruder. This results in a reduction of mechanical work on the material which, in turn, reduces the stock temperatures of the material.

An object of this invention is the provision of an improved annular extrusion die particularly adapted for processing high molecular weight resin.

An object of this invention is the provision of an annular extrusion die having means for applying a shearing action to the material as it passes through the die annulus.

An object of this invention is the provision of an annular extrusion die having means providing a pumping action which reduces the pressure in the extruder.

An object of this invention is the provision of an annular extrusion die constructed and arranged to minimize degrading of high molecular weight resins.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 5 is a side cross-sectional view, similar to FIG. 2, of another embodiment of the invention;

FIG. 6 is a side-sectional view of another form of the shear ring;

FIG. 7 is a fragmentary view, in section, of another embodiment of the invention.

DESCRIPTION OF PRIOR ART

There have been numerous proposals to incorporate grooves or protrusions in one or both of the surfaces facing the annulus formed between the inner mandrel member and the surrounding outer die member of an annular extrusion die. See e.g. U.S. Pat. Nos. 3,281,897; 3,008,187; and 2,937,402 and German Patent No. 1,218,706. However, these prior proposals are all directed to providing circumferential orientation or mixing. They do not provide the means according to the invention for pumping molten plastic resulting from a combination of a rotating shear ring and a helical groove in a surface facing the annulus. Moreover, the rotating devices described in U.S Pat. Nos. 3,281,897 and 3.008,187 employ rotation at the outlet of the die which can result in wrinkling, corrugating and even tearing of viscous extrudates. In contrast, the outlet of the extrusion die of the present invention is stationary so that these difficulties are avoided.

DETAILED DESCRIPTION OF THE INVENTION

Figure 1:
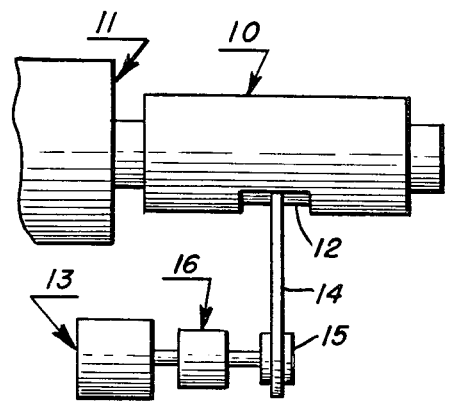
FIG. 1 is a side elevational view, in simplified form, of an annular extrusion die embodying this invention and connected to an extruder.

Referring to FIG. 1, there is shown an annular extrusion die 10 connected to an extruder 11. In accordance with this invention, the die includes a die shear ring 12, mounted for rotation about the die axis. The die shear ring 12 is mechanically coupled to a variable speed drive motor 13 by a drive chain 14 passing around a sprocket 15 connected to the output shaft of a gear reduction unit 16.

Figure 2:
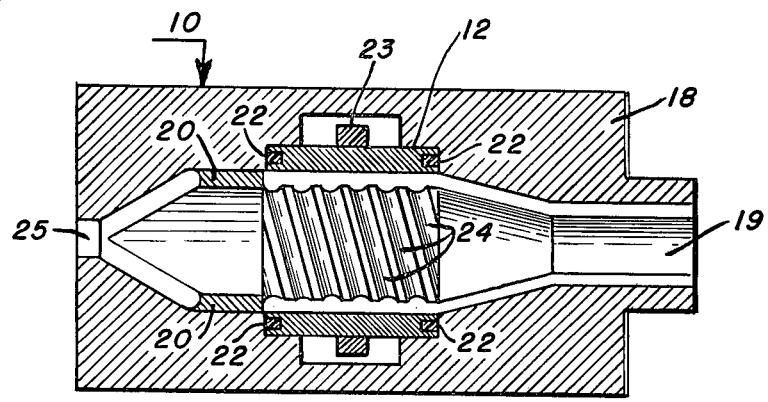
FIG. 2 is a side cross-sectional view taken through the axis of the die.
Figure 3:
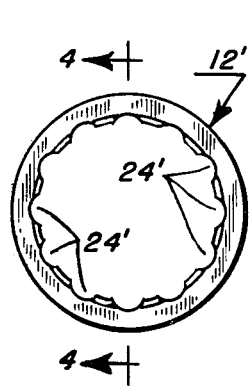
FIG. 3 is an end-elevational view of a modified form of the shear ring.
Figure 4:
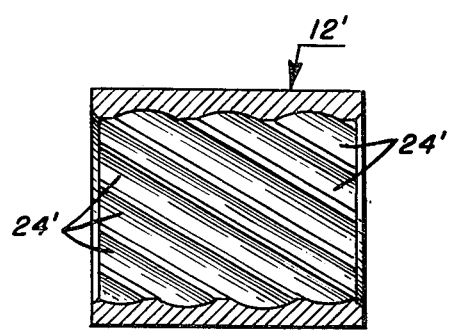
FIG. 4 is a sectional view taken along the line 4—4 of FIG. 3.

As shown in FIG. 2, the extrusion die 10 comprises an outer die member 18 and an inner mandrel 19, said mandrel being secured to the die member by a plurality of radially-spaced streamlined spider legs 20. The die shear ring 12 is positioned in a cylindrical groove formed in the inner surface of the die member 18 and seal rings 22 are provided to prevent material leakage out of the die. A chain sprocket 23 is secured to the outer surface of the die shear ring. In this embodiment of the invention, helical grooves 24 are formed in the surface of the mandrel, whereas the facing surface of the die shear ring is smooth. Alternatively, the mandrel surface may be smooth and helical grooves may be provided in the die shear ring, as shown in FIGS. 3 and 4 wherein the numeral 24' identifies the grooves formed in the die shear ring 12'. Also, the mandrel 19 may be used with the die shear ring 12', mandrel 19 and die shear ring 12' having helices of opposite hand.

In operation, the polymer flows through the die inlet orifice 25, FIG. 2, around the spider legs 20 and into the region of the rotating shear ring 12 or 12'. The relative rotation between the shear ring 12 or 12' and the mandrel 19 pumps the polymer out through the outlet of the die 10.

FIG. 5 shows an alternative embodiment of the invention in which the relative rotation between the mandrel and the die is effected by having the mandrel rotate and the die remain stationary. Thus, with reference to FIG. 5, the extrusion die 30 may be used in place of die 10 shown in FIG. 1. Extrusion die 30 has an offset inlet 31 in outer die member 32 adapted to be connected to the outlet of extruder 11 in a conventional manner. Outer die member 32 accommodates an adjustable terminal member 33, which is adjustable axially by means of adjusting screws 34 to insure that member 33 is coaxial with the axis of the mandrel tip member 40.

Mandrel tip member 40 threadedly engages back member 41, which in turn carries mandrel shear ring 42 having gear teeth 43 that mesh with the teeth of the spur gear 44 carried by drive shaft 45. End cap 46 is bolted to outer die member 32 and to member 41. Bearings 47 and 48 are provided to support the shaft 45 for rotation. Any suitable motor (not shown) may be used to rotate drive shaft 45. Seal rings 49 seal the rotating mandrel shear ring 42.

The die member 32 is provided with helical grooves 50 in the surface facing mandrel shear ring 42. Upon rotation of drive shaft 45, mandrel shear ring 42 will rotate while the die 30 remains stationary.

FIG. 6 shows a further modification of the invention, wherein mandrel shear ring 42' is provided with helical grooves 50'. Shear ring 42' may be substituted for mandrel shear ring 42 in FIG. 5 so that both the die and mandrel will thus be provided with helical grooves, in which case the grooves will be of opposite hand. Alternatively, mandrel shear ring 42' may be substituted for shear ring 42 and the inner surface of the die member 32 can be smooth.

FIG. 7 represents a further alternative embodiment of the invention, wherein rotating shear rings 12' and 42 are provided in the die and mandrel, respectively, the helical groove thus being in the die shear ring 12'. Shear ring 12' (FIG. 7) may be rotated by connection to the motor 13 and chain 14 of FIG. 1.

By the use of the die shear ring 12 or 12' and the mandrel shear ring 42 or 42' in the embodiment shown in FIG. 5, it is possible to have the die shear ring and the mandrel shear ring both rotating, with the helical groove being in the die shear ring, the mandrel shear ring, or both. As mentioned above, when the die and mandrel both employ shear rings with helical grooves, the grooves are of the opposite hand.

The embodiment of the invention shown in FIG. 5 operates in the same manner as the embodiments of FIGS. 1–4. Thus, drive shaft 45 is rotated and polymer is introduced from the extruder into inlet 31. Here again, the shear ring or rings (12, 12', 42, 42') will pump the polymer out through the outlet of die 30.

Figure 8:
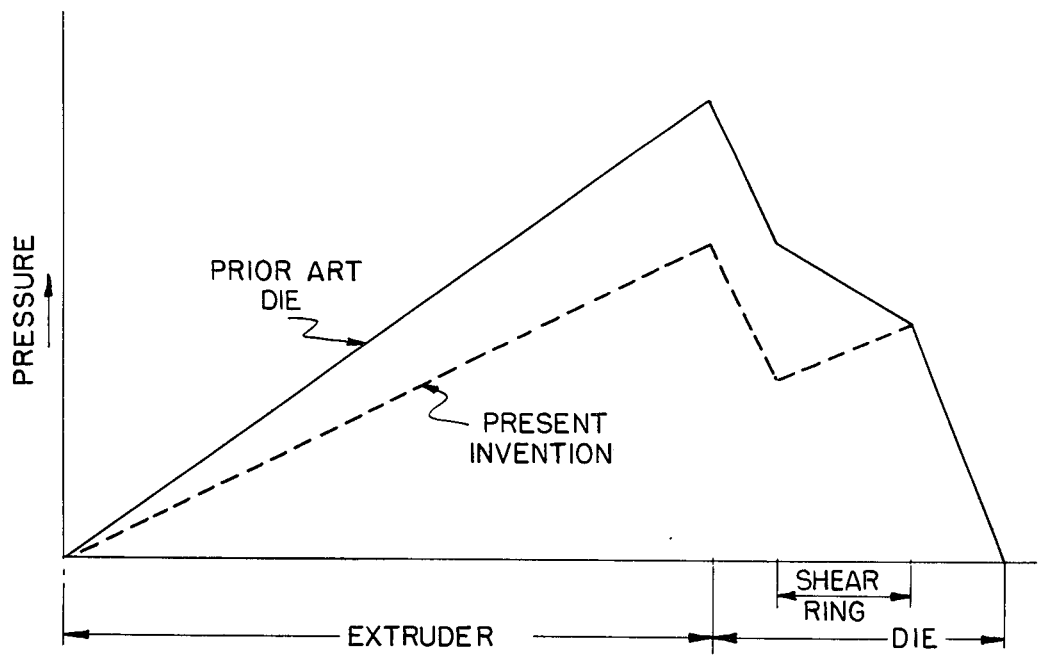
FIGS. 8 and 9 are schematic representations of the pressure and temperature gradients, respectively, through an extruder and die of the prior art and of the invention.
Figure 9:
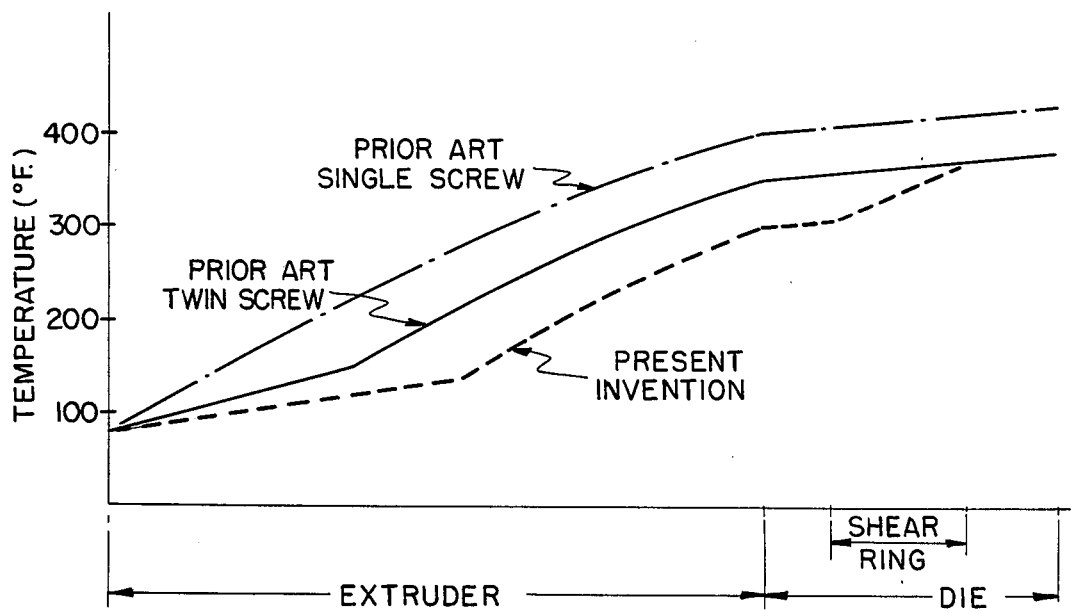

FIGS. 8 and 9 show pressure and temperature profiles, respectively, in prior art extrusion apparatus and in the extrusion die according to the invention. In accordance with the present invention, it is possible, by using sufficient lubrication in the extrusion compound and by controlling the extruder temperature, to hold the melt temperature in the range of 300°–360° F on entering the region of the rotating shear ring or rings. Due to the work input required to shear the material, a controlled temperature rise can be achieved in the region of the shear ring or rings. This also provides uniform mixing and uniformity of melt which results in a smooth extrudate. The pumping action of the rotating shear ring or rings in combination with the helical grooves reduces the pressure acting on the extruder (FIG. 8), which results in a reduction of the stock temperature of the polymer in the extruder (FIG. 9). The arrangement according to the invention acts to maintain the polymer at the lowest possible temperature (FIG. 9) until it passes through the shear ring or rings where the pumping and shearing action causes a rapid temperature rise to bring the polymer to its optimum outlet tempeature just prior to exiting from the die. Since degradation of poly(vinyl chloride) is a function of time and temperature, it is possible to heat PVC to relatively high temperatures for short time periods without encountering excessive degradation. In the proper operation of the described device, the polymer temperature is held as low as possible until the material reaches the shear ring or rings. By conversion of shear work into heat, the temperature rises quickly in the region of the shear ring and the material exits through the annular orifice where the extrudate is cooled and sized. Consequently, the material is at a temperature above the normal range of 300°–360° F for only a short period of time.

The utilization of a rotating shear ring in a pipe extrusion die provides the following advantages:

1. It provides a smooth, uniform extrudate with high molecular weight PVC resins, thus allowing the processor to utilize the optimum physical properties exhibited by these materials.

2. By shearing the material at an angle of substantially 90° to the material flow path, flow discontinuities caused by the spider legs are eliminated, thus providing a more uniform wall thickness with resultant material savings.

3. Since the high temperature residence time is reduced, lower levels of costly stabilizers are needed. This advantage applies to resins of conventional as well as high molecular weight.

The above advantages for pipe extrusion can also be realized in the extrusion of other annular products such as film and parisons for blow molded objects as also with extrusions of other degradable materials such as chlorinated poly(vinyl chloride) and poly(vinylidene chloride). Poly(vinyl chloride) resins normally used for pipe extrusions are classified as GP4-15343 by the ASTM Specification for Poly(vinyl chloride) Resin, ASTM D 1755. The described die allows GP5-15443 resins, or resins of even higher molecular weight, to be processed into pipe with excellent properties.

A pipe extrusion run was made with the device of FIGS. 2 and 3 using poly(vinyl chloride) resin conforming to ASTM GP5-15443 requirements, stabilized with 0.2 percent organotin mercaptide and employing a 2 inch 20/1 length to diameter ratio single screw extruder using a screw with an 0.090 inch metering depth having a 3.5/1 compression ratio. The die consisted of a standard 1 inch Schedule 40 pipe die fitted with a rotatable shear ring 2 inches long and having an internal diameter of 1.280 inches, and forming an annular gap of 0.090 inch with the internal mandrel. The shear ring 12' had 8 helical grooves with a helix angle of 60° between the flight lands and the axis of the ring and with a channel depth of 0.050 inch. The facing surface of the mandrel 19 was smooth.

With the shear ring 12' stationary and the extruder screw operating at 17 RPM, output was 20.8 lbs./hour at a pressure of 2600 psi and a stock temperature of 350° F. The extrudate was lumpy and unfused and a satisfactory pipe could not be formed. With the extruder operating at the same conditions, but with the shear ring 12' rotating at a speed of 33 RPM, output was 25.5 lbs./hour, pressure was 2100 psi and the stock temperature was 385° F. Both the inside and outside surfaces of the pipe were smooth and uniform and the material was completely fused. Power consumed in rotating the shear ring was 800 watts.

While the preferred embodiment of the invention described above employed eight helical grooves in the shear ring, as few as one groove or substantially more than eight grooves can be used. For smaller pipe, it will generally be suitable to use from about 4 to about 12 grooves. For larger pipe, as many as 24 or more grooves may be needed. What is desired is that there be effective mixing and pumping without areas of stagnation, and through the use of conventional extruder screw technology the optimum number of grooves can be readily determined.

If the rheological and thermal properties of the polymer are known, the design of the helices themselves can be calculated from existing procedures. Since it is common to produce a range of tube sizes on any given die head, the optimum operating speed will depend on the diameter and annular opening for the particular size being extruded. Optimum operating conditions can be readily found by first operating the extruder with the shear ring rotating slowly, then gradually increasing the speed of the shear ring until the proper extrudate temperature is reached. The condition of attaining a low operating temperature within the extruder is verified by locating a melt thermocouple in the entry region of the die.

Having now described the invention, what I desire to protect by Letters Patent is set forth in the following claims.

I claim:

1. In a screw extruder for melt extrusion of a polymer, comprising at least one screw for advancing the polymer through the extruder under conditions of elevated temperature and pressure and an annular extrusion die at the outlet of the extruder having an annulus formed between an inner mandrel member and a surrounding outer die member, the improvement which comprises polymer pumping and shearing means spaced from the outlet of said extrusion die comprising shear ring means mounted on at least one of said members and rotatable about the common longitudinal axis of said members, said shear ring means having a surface facing said annulus and spaced from and opposed to a surface of the other of said members, and at least one helical groove is provided in at least one of said surfaces, the outer die member and the inner mandrel member being stationary at the outlet of said extrusion die.

2. Apparatus according to claim 1, wherein said shear ring means is mounted on said die member.

3. Apparatus according to claim 1, wherein said shear ring means is mounted on said mandrel member.

4. Apparatus according to claim 1, wherein a said shear ring means is mounted on said die member and on said mandrel member.

5. Apparatus according to claim 2, wherein the opposed surface of said mandrel member is provided with said helical groove.

6. Apparatus according to claim 2, wherein the surface of said shear ring means is provided with said helical groove.

7. Apparatus according to claim 6, wherein the opposed surface of said mandrel member is provided with said helical groove of opposite hand to said helical groove of said shear ring means.

8. Apparatus according to claim 3, wherein said opposed surface of said die member is provided with said helical groove.

9. Apparatus according to claim 3, wherein the surface of said shear ring means is provided with said helical groove.

10. Apparatus according to claim 9, wherein said opposed surface of said die member is provided with said helical groove of opposite hand to said helical groove of said shear ring means.

11. Apparatus according to claim 4, wherein said surface of said shear ring means on said die member is provided with said helical groove.

12. Apparatus according to claim 4, wherein said surface of said shear ring means on said mandrel member is provided with said helical groove.

13. Apparatus according to claim 12, wherein said surface of said shear ring means on said die member is provided with said helical groove of opposite hand to said helical groove of said shear ring means.

14. Apparatus according to claim 1, in which said extruder is a single screw extruder.

15. Apparatus according to claim 1, in which said extruder is a multiple screw extruder.

* * * * *